United States Patent [19]
Arcella et al.

[11] Patent Number: 6,072,020
[45] Date of Patent: Jun. 6, 2000

[54] FLUORINATED POLYMER PURIFICATION

[75] Inventors: Vincenzo Arcella, Novara; Giulio Brinati; Patrizia Maccone, both of Milan, all of Italy

[73] Assignee: Ausimont S.p.A., Milano, Italy

[21] Appl. No.: 09/340,136

[22] Filed: Jun. 28, 1999

[30] Foreign Application Priority Data

Jun. 30, 1998 [IT] Italy ................... MI98A1505

[51] Int. Cl.$^7$ .................................. C08G 63/00
[52] U.S. Cl. ............................. 528/176; 528/502
[58] Field of Search ..................... 528/176, 502

[56] References Cited

U.S. PATENT DOCUMENTS

| | | | |
|---|---|---|---|
| 2,242,218 | 5/1941 | Auer | 91/70 |
| 3,418,302 | 12/1968 | Darby | 260/87.5 |
| 3,665,041 | 5/1972 | Sianesi et al. | 260/615 A |
| 3,715,378 | 2/1973 | Sianesi et al. | 260/463 |
| 4,910,276 | 3/1990 | Nakamura et al. | 526/247 |
| 4,954,271 | 9/1990 | Green | 252/8 |
| 5,260,492 | 11/1993 | Feiring et al. | 568/685 |
| 5,300,628 | 4/1994 | Honda | 528/482 |
| 5,354,945 | 10/1994 | Detering | 523/310 |

FOREIGN PATENT DOCUMENTS

| | | | |
|---|---|---|---|
| 0 073 087 A1 | 3/1983 | European Pat. Off. | C08F 234/02 |
| 0 148 482 A2 | 7/1985 | European Pat. Off. | C08G 65/22 |
| 0 239 123 A2 | 9/1987 | European Pat. Off. | G11B 5/71 |
| 0235 998 | 9/1987 | European Pat. Off. | |
| 0 633 257 B1 | 4/1997 | European Pat. Off. | C07D 317/42 |
| 0 683 181 B1 | 9/1997 | European Pat. Off. | C08F 16/32 |
| 0 803 557 A1 | 10/1997 | European Pat. Off. | C09D 145/00 |
| WO 95/07306 | 3/1995 | WIPO | C08F 16/24 |
| WO 95/26218 | 10/1995 | WIPO | A62D 1/08 |
| 98 51717 | 11/1998 | WIPO . | |

*Primary Examiner*—Terressa M. Boykin
*Attorney, Agent, or Firm*—Arent, Fox Kintner Plotkin & Kahn

[57] ABSTRACT

Purification process of amorphous polymers comprising the following steps:

a) the amorphous polymer is dissolved in a fluorinated solvent;

b) the solution containing the polymer is microfiltered by semipermeable membranes having a porosity in the range 0.05–0.5 μm, and the permeate forms the polymeric solution purified by contaminants in suspension;

c) the permeate coming from b) is ultrafiltered/nanofiltered by membranes with porosity in the range 10–500 kDa, and the retentate is formed by the polymeric solution purified from the contaminants in solution.

17 Claims, No Drawings

FLUORINATED POLYMER PURIFICATION

The present invention relates to a purification process of amorphous polymers, so as to be used in applications wherein an high purity is required, such as for example in the optical or electronic field, in paticular for optical fibers.

It is known indeed that the presence of contaminants, as powders and suspended particles give scattering phenomena and therefore attenuation increase of the light signal transmitted and therefore reduction of the optical fiber performance. This technical problem is particualrly felt for the perfluorinated polymers used for optical fibers. It is well known that for the perfluorinated polymers, which are capable to transmit light signals in the infrared zone, it is suitable to avoid the presence of contaminants formed by non fluorinated soluble molecules which would give absorption in such spectrum zone.

It is a common praxis, when the polymer synthesis is over and the latex is discharged from the reactor, to have the latex itself coagulated by mechanical stirring and/or addition of an electrolyte, such as for example a $HNO_3$ solution, and after filtration, to dry it in stove at a suitable temperature. By such process a suitable polymer for various applications is obtained. However such procedure does not allow to obtain a polymer with a purity such as to be used in particular applications as, for example, optical applications, in particular optical fibers.

The continuous developemnts of the fluorinated polymers for very sophisticated applications, such as those optical and electronic, require an higher and higher purity of the final product.

A possible solution is that to obtain polymers having an high purity degree, by controlling step by step the various processing steps such as the monomer synthesis, the polymerization and the post-treatment, carrying out such operations in controlled environments. Besides, paying particular attention in avoiding the introduction of contaminants through a severe control of the raw materials and of the materials of the used equipments. This problem solution implies very complex processes from an industrial point of view.

The need was therefore felt to have available a purification process giving the above polymers with an high purity degree using a simpler industrial process.

It has been unexpectedly and surprisingly found by the Applicant a semplified purification process of the polymers with respect to the processes of the prior art, and which allows to give polymers usable in optical and electronic applications, in particular optical fibers.

An object of the present invention is a purification process of amorphous polymers comprising the following steps:

a) the amorphous polymer is dissolved in a fluorinated, preferably ozone-friendly solvent, preferably in a concentration in the range 0.1–15% w/w, more preferably 0.3–5% w/w;

b) the solution containing the polymer is microfiltered by semipermeable membranes having a porosity in the range 0.05–0.5 μm, preferably 0.1–0.3 μm, and the permeate forms the polymeric solution purified by the contaminants in suspension;

c) the permeate coming from b) is ultrafiltered/nanofiltered by membranes with porosity in the range 10–500 kDa, preferably 20–300 kDa, more preferably 20–80 kDa, and the retentate is formed by the polymeric solution purified from the contaminants in solution.

The membranes used in the microfiltration, ultrafiltration/nanofiltration processes can be polymeric or inorganic. Those of polymeric type are thick, asymmetrical, composite; assembled in flat, tubular, spiral or hollow fiber moduli. The membranes of inorganic type can be ceramic or carbon-based. The polymeric membranes can be formed by fluoropolymers such as those based on polyvinylidenfluoride (PVDF), polytetrafluoroethylene (PTFE) or TFE copolymers with vinyl-ether, for instance PFA; or by hydrogenated polymers such as, for example, those based on polypropylene.

The amorphous polymers to be purified are preferably (per)fluoropolymers, preferably based on dioxoles. Among the dioxoles, the perfluoro-2,2-dimethyl-1,3-dioxole (PDD), perfluoro-2,2-fluoro-1,3-dioxole (PD), the dioxoles of general formula

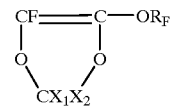

can be mentioned, wherein $R_F$ is a perfluoroalkyl radical having 1–5 carbon atoms, linear or branched when possible; $X_1$ and $X_2$ equal to or different from each other being F or $CF_3$; the one wherein $R_F$ is equal to $CF_3$, $X_1$ and $X_2$ are equal to F (TTD) is preferred. Alternatively to the dioxole non conjugated dienes of the type $CF_2=CFOCF_2CF_2CF=CF_2$,
$CFX^1=CX^2OCX^3X^4OCX^2=CX^1F$ can be used, wherein $X^1$ and $X^2$, equal to or different from each other, are F, Cl or H; $X^3$ and $X^4$, equal to or different from each other, are F or $CF_3$, which during the polymerization cyclopolymerize to give rings in the chain, respectively:

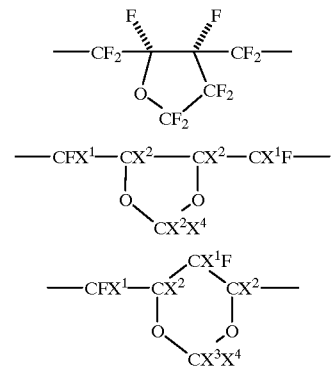

See to this purpose U.S. Pat. Nos. 3,418,302, 4,910,276 and 5,260,492, and EP 683,181.

As amorphous perfluorinated polymers we can mention: the homopolymers of perfluoro-2,2-dimethyl-1,3-dioxole (PDD) or the PDD copolymers with the TFE described in EP 73,087, functional fluoropolymers obtained with the use of functional monomers in PDD-based homopolymers or copolymers described in the application WO 95/07306; the homopolymers of the TTD dioxole or its amorphous copolymers with TFE described in patent application EP 633,257 in the name of the Applicant, in EP 683,181 or in U.S. Pat. Nos. 3,418,302, 4,910,276 and 5,260,492. Instead of TFE or in addition to TFE one or more monomers can be used, such as for example chlorotrifluoroethylene (CTFE), hexafluoropropene (HFP), perfluoroalkylvinylether (PAVE) of formula $CF_2=CFOR'_F$ wherein $R'_F$ is a perfluoroalkyl radical from 1 to 3 carbon atoms, $CF_2=CFOR''_FSO_2F$ wherein $R''_F$ is a perfluoroalkylene radical from 1 to 3 carbon atoms, preferably $CF_2-CF_2$, $(CF(CF_3CF_2O)n$, these units with two and three carbon atoms can be both present, the one having three carbon atoms can be present more than one time in relation to the n value, n being an integer from 0 to 3.

By the microfiltration process polluting particles of relatively large sizes are removed (of about 0.1 μm) such as for example powder, or possible gels coming from polymerization, these particles of large sizes are removed in the retentate. The permeate coming from the microfiltration, formed by the polymeric solution which has undergone the first purification process, is sent to the subsequent ultrafiltration/nanofiltration process. With the ultrafiltration/nanofiltration process the removal of soluble contaminants having a low molecular weight is obtained, such as for example residues of surfactants and other ingredients coming from the polymerization, low molecular weight polymer fractions. The low molecular weight fractions are oligomeric fractions having molecular weight lower than about 5,000. In this case the retentate is formed by the quite purified polymer in solution, while the permeate is formed by the solvent wherein the surfactant and possible polymer fractions having low molecular weight are dissolved. The final polymer of the retentate obtained after purification shows a negligible fraction lower than or equal to 10,000.

The process scheme according to the present invention is reported in FIG. 1.

The solvents usable to prepare the solution of step a) are those perfluorinated, optionally containing ethereal oxygen in the molecule or heteroatoms such as nitrogen; perfluoropolyethers containing perfluorooxyalkylene units and with perfluorinated end groups, optionally the end groups containing one or more hydrogen atoms.

The boiling points of the perfluoropolyether products are generally in the range 60°–300° C., preferably 80°–160° C.

As solvents, the perfluoro(n-butyl-tetrahydrofuran), perfluoropolyethers having perfluorinated end groups, such as perfluoroheptane (GALDEN® D80) commercialized by Ausimont having a boiling temperature of 82° C. and number average molecular weight of 390, perfluoropolyethers wherein at least a perfluorinated end group contains an hydrogen atom, and/or chlorine atom can specifically be mentioned.

The perfluoropolyethers are polymers containing the following units statistically distributed along the chain selected from: $(C_3F_6O)$, $(C_2F_4O)$, (CFXO) wherein X is equal to F or $CF_3$, $(CR_1R_2CF_2CF_2O)$ wherein $R_1$ equal to or different from $R_2$ is H, F, $C_1-C_3$ perfluoroalkyl.

The following perfluoropolyethers can specifically be mentioned:

a1) $-O(C_3F_6O)_{m'}(CFXO)_{n'}-$ wherein the units $(C_3F_6O)$ and (CFXO) are perfluorooxyalkylenic units statistically distributed along the chain; m' and n' are integers such as to give products with boiling points generally in the range 60°–300° C., and m'/n' is comprised between 5 and 40, when n' is different from 0; X is equal to F or $CF_3$; n' can also be 0;

b1) $-O(C_2F_4O)_{p'}(CFXO)_{q'}-(C_3F_6O)_{t'}$ wherein p', q' and t' are integers such as to give products with the boiling point indicated in a), p'/q' ranges between 5 and 0.3, preferably 2.7–0.5; t' can be 0 and q'/(q'+p'+t') lower than or equal to 1/10 and the t'/p' ratio is from 0.2 to 6;

c1) $-(CR_1R_2CF_2CF_2O)_n-$ wherein $R_1$ and $R_2$ have the meaning above indicated, and n is an integer such as to give products with the boiling point indicated in a1); the end groups being selected from $-CF_3$, $-C_2F_5$, $-C_3F_7$, $-CF_2H$, $-CFHCF_3$.

The indicated fluoropolyethers are obtainable by the well known processes in the art for example in U.S. Pat. Nos. 3,665,041, 2,242,218, 3,715,378, 4,954,271 and EP 239,123, EP 148,482, WO 95/26218.

The perfluoropolyethers or hydrofluoropolyethers (the perfluoropolyethers with the perfluorinated end groups containing at least one hydrogen and/or chloribe atom) are formed by a mixture of components having a different molecular weight with the boiling points comprised in the previously described ranges.

The polymer purified as described in the present invention can be used in solution as such or separated from the solvent in subsequent processes for the preparation of optical fibers. The purified polymer can generally be used for coatings, for example having a low thickness, obtainable by methods such as spin coating, casting, deep coating, for all the optical and electronic applications wherein a polymer having a high purity is required.

By the process of the present invention semipermeable membranes free of defects from contamination, can also be prepared.

The examples reported hereinunder have the purpose to illustrate, without anyway limiting it, the process object of the present invention.

EXAMPLES

Used Equipments

The microfiltration tests have been carried out by using a Sepracor Inc. (Fluid Management System) plant equipped with polypropylene membrane hollow fiber moduli with 0.2 μm porosity (cut-off). The solution feeding containing the polymer is sent through one of the two modulus extremities (hollow fiber lumen) under pressure. The permeating solution flows in the shell and flows out through the two modulus ducts. The retentate flows out from the other modulus end and is recycled in the feeding tank.

The ultrafiltration tests have been carried out on Berghof GmbH cell equipped with flat membrane Dow FS 40 PP type based on fluoropolymer and with 50 kDa porosity (cut-off) The cell is in stainless steel and has a stirring system. The solution is filtered under a pressure gradient produced by a nitrogen flow.

Example

A polymer prepared according to Example 3 of the patent application EP 803,557 in the name of the Applicant, has been used. The polymer contains 67% by moles of 2,2,4-trifluoro-5-trifluoromethoxy-1,3-dioxole while the complement to 100 is constituted by tetrafluoroethylene. The polymer glass transition temperature is of 119° C. and the intrinsic viscosity, measured at 25° C. in perfluoroheptane is of 55 cc/g.

The polymer shows a residue formed by surfactant of

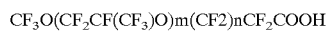

type, having average molecular weight of 600 and the surfactant amount on the polymer in powder is equal to 1600 ppm.

A solution of the polymer above described in Galden® HT 110 (b.p. 110° C. ) at a concentration equal to 0.5% w/w, is prepared. The polymeric solution is microfiltered in the following experimental conditions:

axial speed=450 rpm temperature=22° C.

pressure difference=5 PSI

The permeate flow Jp (l/m²h) at steady conditions is of about 60 l/m²h. The laser light scattering analysis (LLS) of a part of such permeate has shown the absence of suspended particles with respect to the starting solution.

The permeate is then submitted to ultrafiltration at a temperature of 15° C. and a pressure of 9 bar.

The permeate flow Jp (l/m²h) at steady conditions is of 2.5 l/m²h.

It is noticed how after a transitory starting state the flow does not change very much in the time.

In the permeate no presence of polymer is noticed, therefore the efficacy of the purification process is demonstrated. The polymer present in the retentate is evaporated, dried and submitted to distribution measurements of the molecular weight by GPC (gel permeation chromatography) and residual surfactant by gaschromatography upon extraction of the surfactant from the sample and transformation into methylic esters.

The polymer GPC after the microfiltration and ultrafiltration process is substantially coincident with that of the starting polymer. The fact that GPC does not change in a meaningful way shows that the polymer does not undergo meaningful structural modifications; while the suspended and soluble contaminants are separated.

Indeed the surfactant content varies from a value of 1600 ppm before the ultrafiltration process to a <10 ppm value after the ultrafiltration process. Therfore it is shown that the polymer has undergone a purification process without being damaged at all in its structure.

What is claimed is:

1. A process for purifying amorphous polymers comprising the following steps:

a) dissolving amorphous polymers in a fluorinated solvent to obtain a solution in a concentration in the range 0.1–15% w/w;

b) microfiltering the solution containing the polymer with impermeable membranes having a porosity in the range 0.05–0.5 μm forming a permeate of a polymeric solution purified from the contaminants in suspension; and c) ultrafiltering/nanofiltering the permeate of b) with membranes having a porosity in the range 10–500 kDa, and obtaining a retentate containing the polymeric solution purified from the contaminants in solution.

2. The process according to claim 1 wherein:

a) the amorphous polymer is dissolved in a fluorinated solvent in a concentration in the range 0.3–5% w/w;

b) the solution containing the polymer is microfiltered by semipermeable membranes having a porosity in the range 0.1–0.3 μm and the permeate forms the polymeric solution purified from the contaminants in suspension; and c) the permeate of b) is untrafiltered/nanofiltered by membranes having a porosity in the range 20–80 kDa, untrafiltered/nanofiltered.

3. The purification process according to claim 1 wherein the membranes used in the microfiltration and ultrafiltration/nanofiltration steps are polymeric or inorganic.

4. The purification process according to claim 3 wherein the polymeric membranes are thick, asymmetrical, composite; assembled in flat, tubular, spiral, hollow fiber moduli.

5. The purification process according to claim 3 wherein the polymeric membranes are formed by fluoropolymers based on polyvinylidenfluoride (PVDF), polytetrafluoroethylene (PTFE), TFE copolymers with vinylether, or by hydrogenated polymers.

6. The purification process according to claim 3 wherein the inorganic membranes are ceramic or carbon-based.

7. The purification process according to claims 1 wherein the amorphous polymers to be purified are (per) fluoropolymers based on dioxoles selected from:

perfluoro-2,2-dimethyl-1,3-dioxole (PDD), perfluoro-2,2-fluoro-1,3-dioxole (PD), dioxoles of general formula

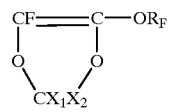

wherein $R_F$ is a perfluoroalkyl radical having 1–5 carbon atoms, linear or branched; $X_1$ and $X_2$ are equal to or different from each and are F or $CF_3$.

8. The purification process according to claim 7 wherein $R_F$ is $CF_3$, $X_1$ and $X_2$ are F (2,2,4-trifluoro-5-trifluoromethoxy-1,3-dioxole-TTD).

9. The purification process according to claim 1 wherein the amorphous polymers to be purified are (per) fluoropolymers based on non-conjugated dienes of the type:

$$CF_2=CFOCF_2CF_2CF=CF_2, CFX^1=CX^2OCX^3X^4OCX^2=CX^1F$$

wherein $X^1$ and $X^2$, equal to or different from each other, are F, Cl or H; $X^3$ and $X^4$, equal to or different from each other, are F or $CF_3$.

10. The purification process according to claim 7 wherein the amorphous polymers are selected from:

homopolymers of perfluoro-2,2-dimethyl-1,3-dioxole (PDD) or PDD/TFE copolymers, functional monomers/PDD copolymers, homopolymers of TTD or its amorphous copolymers with TFE.

11. The purification process according to claim 10 wherein instead of TFE or in addition to TFE one or more monomers are used, selected from: chlorotrifluoroethylene (CTFE), hexafluoropropene (HFP), perfluoroalkylvinylether (PAVE) of formula $CF_2=CFOR'_F$ wherein $R'_F$ is a perfluoroalkyl radical from 1 to 3 carbon atoms, $CF_2=CFOR''_FSO_2F$ wherein $R''_F$ is a perfluoroalkylenic radical from 1 to 3 carbon atoms.

12. The purification process according to claim 1, wherein the solvents for the solution of step a) are perfluorinated, optionally containing ethereal oxygen in the molecule or heteroatoms; perfluoropolyethers containing perfluorooxyalkylenic units and with perfluorinated end groups, optionally the end groups containing one or more hydrogen atoms.

13. The purification process according to claim 12 wherein the boiling points of the perfluoropolyether solvents are in the range of 60°–300° C.

14. The purification process according to claim 12 wherein the solvents are perfluoro(n-butyl-tetrahydrofuran), perfluoropolyethers with perfluorinated end group, perfluoropolyethers wherein at least a perfluorinated end group contains a hydrogen atom.

15. The purification process according to claim 14 wherein the perfluoropolyethers contain the following units statistically distributed along the chain selected from the group consisting of: $(C_3F_6O)$, $(C_2F_4O)$, $(CFXO)$ wherein X is equal to F or $CF_3$, $(CR_1R_2CF_2CF_2O)$ wherein $R_1$ is equal to or different from $R_2$ which is H, F, and $C_1$–$C_3$ perfluoroalkyl.

16. The purification process according to claim 12 wherein the perfluoropolyethers are selected from the group consisting of:

a1) —$O(C_3F_6O)_{m'}(CFXO)_{n'}$— wherein the units $(C_3F_6O)$ and $(CFXO)$ are perfluorooxyalkylene units statistically distributed along the chain; m' and n' are integers to give products with boiling points in the range 60°–300° C., and m'/n' is comprised between 5 and 40, when n' is different from O; X is equal to F or $CF_3$; n' can also be O;

b1) —$O(C_2F_4O)_{p'}(CFXO)_{q'}$—$(C_3F_6O)_{t'}$
   wherein p', q' and t' are integers to give products with the boiling point indicated in a), p'/q' ranges between 5 and 0.3; t' can be 0 and $q'/(q'+p'+t')$ is less than or equal to 1/10 and the t'/p' ratio is from 0.2 to 6;

c1) $-(CR_1R_2CF_2CF_2O)n-$ wherein $R_1$ and $R_2$ have the meaning above indicated, and n is an integer to give products with the boiling point indicated in a1); the end groups being selected from the group consisting of $-CF_3$, $C_2F_5$, $-C_3F_7$, $-CF_2H$, and $-CFHCF_3$.

17. The purification process according to claim 1 wherein the purified polymer is used for the preparation of optical fibers, low thickness coatings, and semipermeable membranes.

* * * * *